United States Patent
Gao et al.

(10) Patent No.: US 12,537,756 B2
(45) Date of Patent: Jan. 27, 2026

(54) LINK PROCESSING METHOD AND APPARATUS, NETWORK DEVICE, AND STORAGE MEDIUM

(71) Applicant: ZTE CORPORATION, Guangdong (CN)

(72) Inventors: Yong Gao, Guangdong (CN); Shaozheng Qian, Guangdong (CN); Qianchun Lu, Guangdong (CN); Jin Qi, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 63 days.

(21) Appl. No.: 18/563,551

(22) PCT Filed: Jun. 16, 2022

(86) PCT No.: PCT/CN2022/099093
§ 371 (c)(1),
(2) Date: Nov. 22, 2023

(87) PCT Pub. No.: WO2022/262798
PCT Pub. Date: Dec. 22, 2022

(65) Prior Publication Data
US 2024/0250893 A1    Jul. 25, 2024

(30) Foreign Application Priority Data
Jun. 18, 2021 (CN) .......................... 202110678522.7

(51) Int. Cl.
*H04L 45/036* (2022.01)
*H04L 45/12* (2022.01)

(52) U.S. Cl.
CPC ............ *H04L 45/036* (2022.05); *H04L 45/12* (2013.01)

(58) Field of Classification Search
CPC ............................. H04L 45/036; H04L 45/12
(Continued)

(56) References Cited

U.S. PATENT DOCUMENTS 7,852,758 B2    12/2010 Kataoka et al.
2009/0022070 A1*  1/2009 Lovanna ................. H04L 45/22
                                                        370/256

(Continued)

FOREIGN PATENT DOCUMENTS

| CN | 1764154 A | | 4/2006 | |
| CN | 101572674 A | * | 6/2009 | ........... H04L 12/721 |

(Continued)

OTHER PUBLICATIONS

Y. V. Makarov, R. C. Hardiman and D. L. Hawkins, "Risk, reliability, cascading, and restructuring," IEEE Power Engineering Society General Meeting, 2004., Denver, CO, USA, 2004, pp. 383-395 vol. 1 (Year: 2004).*

(Continued)

*Primary Examiner* — Taylor A Elfervig
(74) *Attorney, Agent, or Firm* — Li & Cai Intellectual Property (USA) Office (57) ABSTRACT

The present disclosure provides a link processing method and apparatus, a network device, and a storage medium. The method includes: acquiring the number of state changes and first state duration of a link in a preset time period; calculating risk information of the link based on the number of state changes and the first state duration; performing path computation based on the risk information; and performing risk suppression on path switching according to a result of the path computation.

13 Claims, 5 Drawing Sheets

(58) Field of Classification Search
USPC .......................................................... 709/238
See application file for complete search history.

(56) References Cited

U.S. PATENT DOCUMENTS

2016/0182344 A1   6/2016  Subhedar
2018/0330103 A1*  11/2018 Chari ................. H04L 63/1433

FOREIGN PATENT DOCUMENTS

| CN | 107769951 A |   | 3/2018 |              |
|----|-------------|---|--------|--------------|
| CN | 112422442 A |   | 2/2021 |              |
| CN | 112532518 A | * | 3/2021 | ........... H04L 45/125 |

OTHER PUBLICATIONS

S. K. Mishra, A. Mishra and D. P. Mohapatra, "Risk analysis of a system at design level using UML diagrams, " 2013 International Conference on Advances in Computing, Communications and Informatics (ICACCI), Mysore, India, 2013, pp. 197-202 (Year: 2013).*
P. Zhao, X. Chen, P. Yu, W. Li, X. Qiu and S. Guo, "Risk assessment and optimization for key services in smart grid communication network," 2017 IFIP/IEEE Symposium on Integrated Network and Service Management (IM), Lisbon, Portugal, 2017, pp. 600-603 ( Year: 2017).*
R. Clemente, M. Bartoli, M. C. Bossi, G. D'Orazio and G. Cosmo, "Risk management in availability SLA," DRCN 2005). Proceedings. 5th International Workshop on Design of Reliable Communication Networks, 2005., Naples, Italy, 2005, pp. 8 (Year: 2005).*
European Patent Office, the Extended European Search Report dated Sep. 26, 2024, for corresponding EP application No. 22824271. 5.
WIPO, International Search Report issued on Aug. 31, 2022.

* cited by examiner

LINK PROCESSING METHOD AND APPARATUS, NETWORK DEVICE, AND STORAGE MEDIUM

CROSS-REFERENCE TO RELATED APPLICATIONS

The present disclosure claims the priority to Chinese Patent Application No. 202110678522.7 filed on Jun. 18, 2021, the entire contents of which are incorporated herein by reference.

TECHNICAL FIELD

The present disclosure relates to the technical field of communications, and in particular, to a link processing method and apparatus, a network device, and a storage medium.

BACKGROUND

In an actual network, due to a plurality of reasons such as poor contact, temperatures, humidity, and operation time, a phenomenon of "link down-link up-link down-link up" occurs frequently in some links at a certain period of time, and such phenomenon is called link oscillation.

When occurring in the network, the link oscillation is usually accompanied with a large amount of rerouting and switch-back operations on services in the network, resulting in frequent changes of the services, and an increase of risk of packet loss of data on a forwarding plane.

SUMMARY

The present disclosure provides a link processing method and apparatus, a network device, and a storage medium.

An embodiment of the present disclosure provides a link processing method applied to a link processing apparatus, including: acquiring a number of state changes and first state duration of a link in a preset time period; calculating risk information of the link based on the number of state changes and the first state duration; performing path computation based on the risk information; and performing risk suppression on path switching according to a result of the path computation.

An embodiment of the present disclosure provides a link processing apparatus, including: an information acquisition module configured to acquire a number of state changes and first state duration of a link in a preset time period; a risk calculation module configured to calculate risk information of the link based on the number of state changes and the first state duration; a path computation module configured to perform path computation based on the risk information; and a risk suppression module configured to perform risk suppression on path switching according to a result of the path computation.

An embodiment of the present disclosure provides a network device, including: one or more processors; and a memory having stored thereon one or more programs which, when executed by the one or more processors, cause the one or more processors to implement the link processing method according to any one of the embodiments of the present disclosure.

An embodiment of the present disclosure further provides a non-transitory computer-readable storage medium storing a computer program which, when executed by a processor, implements the link processing method according to any one of the embodiments of the present disclosure.

With respect to the above embodiments and other aspects of the present disclosure, and the implementations thereof, more description will be given in the Drawings, the Detailed Description, and the Claims.

DETAIL DESCRIPTION OF EMBODIMENTS

In order to make the objectives, technical solutions and advantages of the present disclosure clearer, embodiments of the present disclosure are described in detail below with reference to the drawings. It should be noted that the embodiments described herein and the features therein can be arbitrarily combined with one another if no conflict is incurred.

Figure 1:
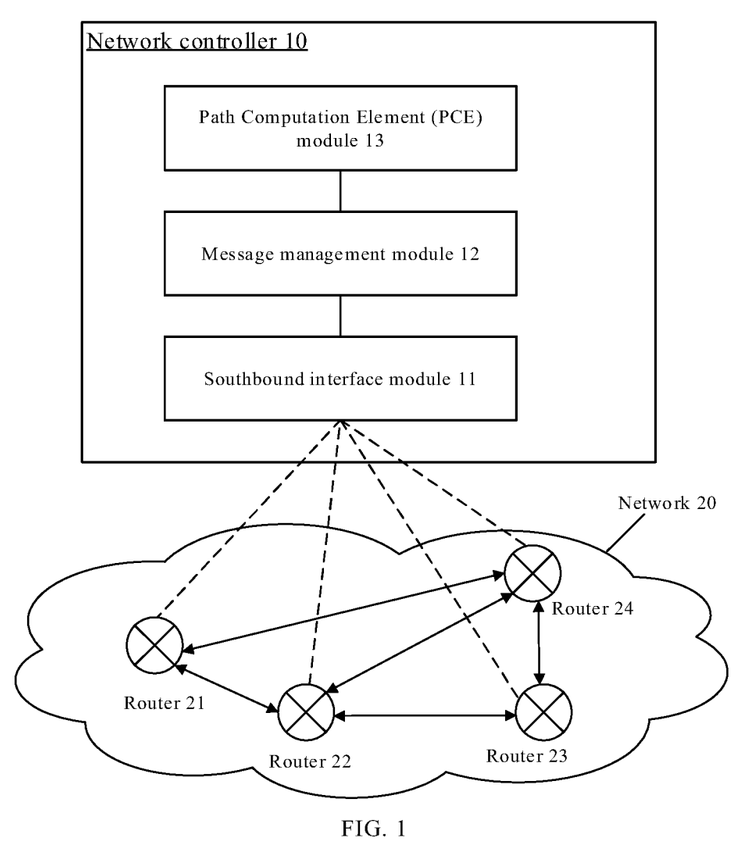
FIG. 1 is a schematic diagram of an architecture of a network management system according to an embodiment of the present disclosure.

FIG. 1 is a schematic diagram of an architecture of a network management system according to an embodiment of the present disclosure. The architecture of the network management system shown in FIG. 1 includes: a network controller 10 and a network 20. The network controller 10 may include: a southbound interface module 11, a message management module 12, and a Path Computation Element (PCE) module 13.

In some embodiments, the southbound interface module 11 may be configured to receive link change messages reported by devices in the network 20 and send path computation results of the network controller 10 to the devices in the network 20. Exemplarily, the link change messages may be included in alarm messages reported by network devices in the network 20.

In some embodiments, the southbound interface module 11 is a module through which the network controller 10 performs data interaction with switching devices in the network 20. According to predetermined network protocols, the southbound interface may include: an interface based on the Network Configuration Protocol (netconf), an interface based on the Simple Network Management Protocol (SNMP) agent, and an interface based on the OpenFlow Protocol, which may realize interface analysis of the corresponding protocols.

In some embodiments, the message management module 12 may be configured to analyze messages which are reported by the devices in the network 20 via the southbound interface, and distribute the received messages. In the embodiments of the present disclosure, the link change messages reported by the devices in the network 20 via the southbound interface may include: link-down messages or link-up messages. The message management module 12 may distribute the link change messages to the PCE module 13.

In some embodiments, the PCE module 13 may be configured to compute, using network topology information already existing in the network 20, one end-to-end path which satisfies a preset restriction condition and a preset computation strategy. In the embodiments of the present disclosure, the PCE module 13 may be configured to identify risk links, obtain a feasible path from a source node to a sink node based on path computation, and properly bypass the risk links in view of risk information of the links during the path computation.

In some embodiments, the type of the network 20 may be, for example, any one of the following different types: a microwave bearer network, an internet protocol (IP) bearer network, a bearer network based on Optical Transport Network, or a bearer network based on Flexible Ethernet. The devices in the network 20 may be, for example, switching devices or terminal equipment; and the switching devices may include, for example, switches and routers, such as a router 21, a router 22, a router 23, and a router 24 shown in FIG. 1.

It should be understood that the network controller 10 in FIG. 1 may further include more other modules, and the number of the network function modules and the number of the southbound interfaces for the different types of networks are merely illustrative, may be adjusted flexibly according to actual application needs, and may be configured flexibly according to specific requirements, which is not limited herein.

In some application scenarios, when a link is down (disconnected), in order to ensure smoothness/connectivity of the network, a deployed service needs to be migrated from the "down" link to another normally "up" link through network management and control, and this migration process may be called rerouting. When the link is changed from being down to being up, in order to ensure an optimal path of the original service and maintain optimality and stability of network traffic distribution, the previously migrated service needs to be restored to the original link, and this restoration process may be called switch-back. When the phenomenon of "link down-link up-link down-link up" occurs frequently in some links, a large amount of rerouting and switch-back operations are caused, resulting in frequent changes of services and an increase of risk of packet loss of data on a forwarding plane; meanwhile, in a large-scale network, the frequent rerouting and switch-back operations pose great challenges to the computing capacity and processing capacity of the control plane.

In some application scenarios, since a plurality of factors may possibly cause oscillation of a link (or a link interface), the oscillation of the link becomes accidental when the different factors are combined, that is, the link oscillates in a certain time period, and recovers to a normal state after the oscillation lasts for a period of time. For the link which is oscillating, a general network management and control measure is: reducing invalid rerouting and invalid switch-back associated with the link; and for the link recovering from the oscillation to the normal state, resuming normal rerouting and switch-back. Since a part of the factors causing the link oscillation have certain periodicity and repeatability, for example, the temperature is high during the day time and is low at night, there is a high probability that the link which has oscillated before may oscillate again afterward, and the link which may oscillate again in the future has some risk, and is called a risk link in the present disclosure.

The above network management and control measures lack management of the risk link, treat the risk link and the normal link in the same way, do not take an influence of the risk link on the services into consideration, lack self-adaptive means for the oscillating link, and often adopt a method of delayed switch-back or a method of rerouting again after multiple accumulated times to suppress the oscillation, lacking self-adaptability.

Figure 2:
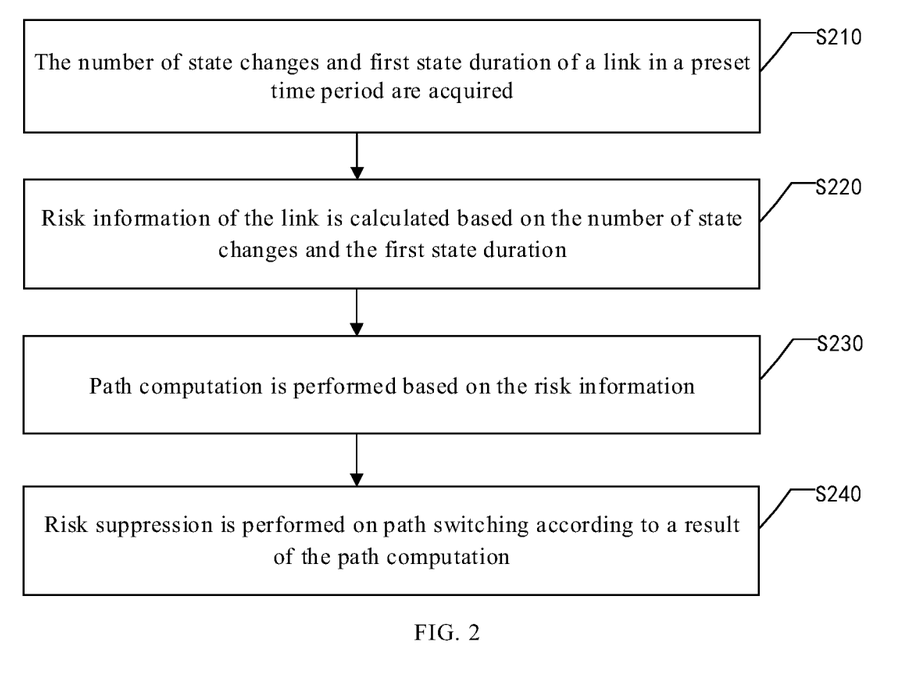
FIG. 2 is a flowchart illustrating a link processing method according to an embodiment of the present disclosure.

FIG. 2 is a flowchart illustrating a link processing method according to an embodiment of the present disclosure. As shown in FIG. 2, the link processing method according to the embodiment of the present disclosure may include the following operations S210 to S240.

At operation S210, the number of state changes and first state duration of a link in a preset time period are acquired.

At operation S220, risk information of the link is calculated based on the number of state changes and the first state duration.

At operation S230, path computation is performed based on the risk information.

At operation S240, risk suppression is performed on path switching according to a result of the path computation.

With the link processing method according to the embodiment of the present disclosure, the risk information of the link is calculated according to the received number of state changes and the received first state duration of the link in the preset time period, the path computation is performed on a service which needs to be switched to another path according to the risk information, and the risk suppression is performed on the path switching according to the result of the path computation. Thus, identification and self-adaptive suppression of risk links can be realized based on historical statistical analysis, therefore, the risk information of the links can be effectively identified, and the risk suppression can be correspondingly performed in a management and control level, so that the frequent changes of the services can be prevented, and the risk of the packet loss of the data on the forwarding plane can be reduced.

In some embodiments, before the operation S210, the link processing method further includes: determining that a current time reaches a time for regularly updating the risk information of the link; or, determining that state change information of the link is received.

With the link management method according to the embodiments of the present disclosure, the risk information of the link can be obtained by calculation periodically or in response to the received state change information of the link. That is, data updating of the risk information of the link may be performed in two modes, one is periodic updating, and the other is updating triggered by the information of the link, thereby performing calculation and identification of the risk information of the link.

In some embodiments, the risk information includes a risk level; and the number of the preset time period is at least one. In these embodiments, operation S210 may specifically include the following operations S11 to S13.

At operation S11, if the number of state changes in a shortest time period is greater than or equal to a change number threshold corresponding to the shortest time period, the risk level of the link is determined as high risk, wherein the shortest time period is the minimum value among the at least one preset time period, and is less than or equal to a preset time period threshold.

At operation S12, if the number of state changes in an acquired non-shortest time period among the at least one preset time period meets a corresponding change number limit condition, or if the first state duration in the acquired non-shortest time period meets a corresponding duration limit condition, the risk level of the link in the acquired non-shortest time period is determined as medium risk.

At operation S13, if the number of state changes in the acquired non-shortest time period does not meet the corresponding change number limit condition and the first state duration in the acquired non-shortest time period does not meet the corresponding duration limit condition, the risk level of the link in the acquired non-shortest time period is determined as low risk.

With the link management method according to the embodiment of the present disclosure, the risk level of the link can be determined according to the number of state changes and the corresponding change number limit condition, as well as the first state duration and the corresponding duration limit condition, so that risk links with different influences can be effectively identified for users to subsequently perform network management according to the links having different risk levels, thereby suppressing the occurrence of risks.

In the embodiment of the present disclosure, the number of state changes of the link refers to the number of changes from the first state to the second state. In a case where the first state is a link-up state, the second state is a link-down state; and in a case where the first state is the link-down state, the second state is the link-up state.

In some embodiments, the change number limit condition in the operation S12 is: the number of state changes in the acquired non-shortest time period is greater than or equal to the preset change number threshold corresponding to the acquired non-shortest time period.

In a case where the first state is the link-up state and the second state is the link-down state, the first state duration is an operation duration, and the duration limit condition is: an operation duration proportion (a proportion of operation duration) of the link in the non-shortest time period is less than an operation duration proportion threshold corresponding to the acquired non-shortest time period.

In a case where the first state is the link-down state and the second state is the link-up state, the first state duration is an idle duration, and the duration limit condition is: an idle duration proportion of the link in the acquired non-shortest time period is greater than or equal to an idle duration proportion threshold corresponding to the acquired non-shortest time period.

With the link management method according to the embodiment of the present disclosure, an assessment of the risk level of the link is mainly based on two variables: the number of state changes and the first state duration of the link. The two variables may be, for example, the number of state changes of the link from being up to being down and the operation duration proportion of the link, or the number of state changes of the link from being down to being up and the idle duration proportion of the link. In other words, the first state may be set as the link-up state (or an operating state) of the link; and the first state may also be set as the link-down state (or a non-operating state) of the link.

In the embodiments of the present disclosure, a total number of preset time periods is N, which is an integer greater than or equal to 1. When N=1, the preset time period is a preset shortest time period, which is less than or equal to the preset time period threshold; and illustratively, the preset shortest time period may be a minute-level time period. When N is greater than 1, the preset time periods may include the preset shortest time period and at least one non-shortest time period longer than the shortest time period; and illustratively, the non-shortest time period may be an hour-level time period.

In an example, in a case where the total number of the preset time period is 1, the preset time period is a preset shortest time period, which may be set to, for example, 10 minutes, and the change number threshold corresponding to the shortest time period may be set to 5. In this example, if the number of state changes (from the link-up state to the link-down state, or from the link-down state to the link-up state) of the link in 10 minutes is greater than or equal to 5, the risk level of the link is determined as high risk.

In an example, if the total number of the preset time periods is greater than 1, the preset time periods include a preset shortest time period and at least one non-shortest time period. For example, the preset time periods may include two time periods, three time periods, or more time periods.

The method for determining the risk level of the link will be described below by taking the preset time periods being two time periods as an example.

In this example, the preset time periods are two time periods, which may be, for example, 10 minutes and 1 hour, respectively. The numbers of times of "link-down" and the operation duration proportions are respectively counted in the two time periods.

In the embodiment of the present disclosure, a change of the link from the "link-up" state (or called connected state) to the "link-down" state (or called disconnected state), or a change of the link from the "link-down" state to the "link-up" state, is recorded as one state change (or one time of state change), and the total number of state changes of the link in each preset time period is determined; the operation duration proportion in a certain time period refers to a ratio of the duration of the "link-up" state of the link to the time period; and the idle duration proportion in a certain time period refers to a ratio of the duration of the "link-down" state of the link to the time period.

Illustratively, the change number threshold corresponding to 10 minutes may be set to 5, the change number threshold corresponding to 1 hour may be set to 7, the operation duration proportion threshold corresponding to 1 hour may be set to 0.8, and the idle duration proportion threshold corresponding to 1 hour may be set to 0.2.

In this example, if the number of state changes of a certain link in the network in 10 minutes is 6, the link is directly determined as being at high risk because the number of state changes exceeds the change number threshold of 5 corresponding to the time period of 10 minutes. If, within 1 hour, the number of state changes of the link is greater than or equal to 7, or the operation duration proportion of the link is less than 0.8, or the idle duration proportion of the link is greater than or equal to 0.2, the link is determined as being at medium risk.

The method for determining the risk level of the link will be described below by taking the preset time periods being three time periods as an example. For convenience of description, according to the lengths of the time periods, the three time periods are referred to as the shortest time period, the middle time period, and the longest time period, which may be, for example, 10 minutes, 1 hour, and 24 hours, respectively. The change number thresholds corresponding to the three time periods may be set to 5, 7, and 10, respectively; and the operation duration proportion thresholds corresponding to the middle time period and the longest time period are both set to 0.8.

In the shortest time period of 10 minutes, if the number of state changes (e.g. become link-down state) exceeds the change number threshold of 5 corresponding to the shortest time period, for example, if the number of state changes in 10 minutes is 6, the link may be directly determined as being at high risk. In the middle time period of 1 hour, if the number of state changes exceeds the change number threshold of 7 corresponding to the middle time period or the operation duration proportion is less than the operation duration proportion threshold of 0.8 corresponding to the middle time period, the link is determined as being at medium risk; and in the longest time period of 24 hours, if the number of state changes exceeds the change number threshold of 10 corresponding to the longest time period or the operation duration proportion is less than the operation duration proportion threshold of 0.8 corresponding to the longest time period, the link is determined as being at medium risk.

It should be understood that the number of the preset time periods and the specific time periods may be set according to actual situations in actual application scenarios. For example, the shortest time period may be a minute-level time period (less than 1 hour), the longest time period may be an hour-level time period (greater than or equal to 24 hours), the middle time period other than the shortest time period and the longest time period may be an hour-level time period (greater than or equal to 1 hour and less than 24 hours). The number of the time periods and the lengths (values) of the respective time periods may be set according to actual situations, and are not specifically limited in the embodiments of the present disclosure.

In some embodiments, the risk information includes a risk level and a risk rate. The operation S220 may specifically include the following sub-operations S21 to S24.

At sub-operation S21, a time period used when the risk level is obtained by calculation is taken as a calculation-involved time period.

At sub-operation S22, a first-state duration proportion in each calculation-involved time period is obtained according to a ratio of the first state duration in each calculation-involved time period to the corresponding calculation-involved time period.

At sub-operation S23, normalization processing is performed based on the number of state changes in each calculation-involved time period and a corresponding state change number threshold, as well as the first-state duration proportion in each calculation-involved time period and a corresponding first-state duration proportion threshold, so as to obtain risk rates of the link in each calculation-involved time period.

At sub-operation S24, a maximum rate value of the risk rates of the link in the respective calculation-involved time periods is taken as the risk rate of the link.

The risk rate of each link in the network can be obtained by calculation through the above sub-operations S21 to S24.

In some embodiments, the normalization processing in the operation S23 may include, for example, the following sub-operations S31 to S33.

At sub-operation S31, first normalization processing is performed on the number of state changes in the calculation-involved time period and the corresponding state change number threshold to obtain the risk rate of the link caused by a state change in the calculation-involved time period.

In an example, in a case where the first state is the link-up state, the first normalization processing may be performed according to the following formula (1-1) to obtain the risk rate caused by the state change in the calculation-involved time period.

$$f_{downNum}(downNum, threshold1) = k1 + \frac{k2}{1 + e^{1-\frac{downNum}{threshold1}}} \quad (1-1)$$

In the formula (1-1), $f_{downNum}$ represents the risk rate caused by the number of state changes of the link from the link-up state to the link-down state, and downNum is the number of state changes of a current link from the link-up state to the link-down state in the calculation-involved time period, and threshold1 is the state change number threshold corresponding to the calculation-involved time period. Illustratively, k1=0.4 and k2=0.4. It should be understood that the values of k1 and k2 may be customized according to actual situations, and are not specifically limited in the embodiments of the present disclosure.

In an example, in a case where the first state is the link-down state, the first normalization processing may be performed according to the following formula (1-2) to obtain the risk rate caused by the state change in the calculation-involved time period.

$$f_{upNum}(upNum, threshold1) = k1 + \frac{k2}{1 + e^{1-\frac{upNum}{threshold1}}} \quad (1-2)$$

In the formula (1-2), $f_{upNum}$ represents the risk rate caused by the number of state changes of the link from the link-down state to the link-up state, and upNum is the number of state changes of a current link from the link-down state to the link-up state in the calculation-involved time period, and the meaning of threshold1 and the values of k1 and k2 are the same as those in the formula (1-1), and thus will not be repeated here.

At sub-operation S32, second normalization processing is performed based on the first-state duration proportion in the calculation-involved time period and the corresponding first-state duration proportion threshold to obtain the risk rate of the link caused by the first-state duration proportion in the calculation-involved time period.

In an example, in the case where the first state is the link-up state, the second normalization processing may be performed according to the following formula (2-1) to obtain the risk rate caused by the operation duration proportion in the calculation-involved time period.

$$f_{validRadio}^{up}(uptime, threshold2) = k3 - \frac{uptime}{threshold2} \times k4 \quad (2-1)$$

In the formula (2-1), $$f_{validRadio}^{up}$$

is the risk rate caused by the operation duration proportion, uptime is the operation duration proportion in the calculation-involved time period, and threshold2 is the operation duration proportion threshold corresponding to the calculation-involved time period. Illustratively, k3=0.8 and k4=0.2. It should be understood that the values of k3 and k4 may be customized according to actual situations, and are not specifically limited in the embodiments of the present disclosure.

In an example, in the case where the first state is the link-down state, the second normalization processing may be performed according to the following formula (2-2) to obtain a first-state idle duration proportion involved in the calculation and a corresponding first-state duration proportion threshold.

$$f_{validRadio}^{down}(downtime, threshold2) = k3 - \frac{1 - downtime}{threshold2} \times k4 \quad (2-2)$$

In the formula (2-2), $$f_{validRadio}^{down}$$

is the risk rate caused by the idle duration proportion, downtime is the idle duration proportion in the calculation-involved time period, and the meaning of threshold2 and the values of k3 and k4 are the same as those in the formula (2-1), and thus will not be repeated here.

At sub-operation S33, the maximum rate value of the risk rates is acquired from the risk rate caused by the state change and the risk rate caused by the first-state duration proportion and taken as the risk rate corresponding to the risk level of the link.

In an example, if the middle time period is taken as the calculation-involved time period, the risk rate caused by the state change for the middle time period may be expressed as the following formula (3):

$$f_{downNum}^{middle} = f_{downNum}(downnum_{downNum}^{middle}, threshold_{downNum}^{middle}) \quad (3)$$

In the formula (3), $$f_{downNum}^{middle}$$

is the risk rate caused by the number of state changes corresponding to the calculation-involved middle time period, $$downnum_{downNum}^{middle}$$

is the number of state changes corresponding to the calculation-involved middle time period, and $$threshold_{downNum}^{middle}$$

is the state change number threshold corresponding to the calculation-involved middle time period.

In this example, for the middle time period, if the first state is the link-up state, the first-state duration proportion is the operation duration proportion, and the risk rate caused by the operation duration proportion may be expressed as the following formula (4):

$$f_{validRadio}^{middle} = f_{validRadio}^{up}(uptime_{validRadio}^{middle}, threshold_{validRadio}^{middle}) \quad (4)$$

In the formula (4), $$f_{validRadio}^{middle}$$

is the risk rate caused by the operation duration proportion corresponding to the calculation-involved middle time period, $$uptime_{validRadio}^{middle}$$

is the operation duration proportion corresponding to the calculation-involved middle time period, and $$threshold_{validRadio}^{middle}$$

is the operation duration proportion threshold corresponding to the calculation-involved middle time period.

In an example, if the longest time period is taken as the calculation-involved time period, the risk rate caused by the state change in the longest time period may be expressed as the following formula (5):

$$f_{downNum}^{long} = f_{downNum}(downnum_{downNum}^{long}, threshold_{downNum}^{long}) \quad (5)$$

In the formula (5), $f_{downNum}^{long}$ is the risk rate caused by the number of state changes corresponding to the calculation-involved longest time period, $$downnum_{downNum}^{long}$$

is the number of state changes corresponding to the calculation-involved longest time period, and $$threshold_{downNum}^{long}$$

is the state change number threshold corresponding to the calculation-involved longest time period.

In this example, for the longest time period, if the first state is the link-up state, the risk rate caused by the change of the first state may be expressed as the following formula (6):

$$f_{validRadio}^{long} = f_{validRadio}^{up}(uptime_{validRadio}^{long}, threshold_{validRadio}^{long}) \quad (6)$$

In the formula (6), $$f_{validRadio}^{long}$$

is the risk rate caused by the operation duration proportion corresponding to the calculation-involved longest time period, $$\text{uptime}_{validRadio}^{long}$$

is the operation duration proportion corresponding to the calculation-involved longest time period, and $$\text{threshold}_{validRadio}^{long}$$

is the operation duration proportion threshold corresponding to the calculation-involved longest time period.

In some embodiments, the first and second normalization processings described above may also be normalization methods based on z-score or normalization methods based on Hyperbolic Tangent Function (Tanth).

In an example, the z-score based normalization methods may be expressed as the following formula (7):

$$f1(x) = \frac{(x-\mu)}{\sigma} \quad (7)$$

In the formula (7), if the value of x is the number of state changes from the first state to the second state in the calculation-involved time period, μ is an average of the numbers of state changes from the first state to the second state in the preset N time periods, σ is a variance of the numbers of state changes from the first state to the second state in the preset N time periods, and f1(x) is the risk rate obtained by calculation and caused by the state change corresponding to the calculation-involved time period; and if the value of x is the first-state duration proportion in the calculation-involved time period, μ is an average of the first-state duration in the preset N time periods, σ is a variance of the first-state duration in the preset N time periods, and f1(x) is the risk rate obtained by calculation and caused by the first-state duration proportion corresponding to the calculation-involved time period.

In an example, the Tanth-based normalization methods may be expressed as the following formula (8):

$$f2(x) = \frac{e^x - e^{-x}}{e^x + e^{-x}} \quad (8)$$

In the formula (8), if the value of x is the number of state changes from the first state to the second state in the calculation-involved time period, f2(x) is the risk rate obtained by calculation and caused by the state change corresponding to the calculated-involved time period; and if the value of x is the first-state duration proportion in the calculation-involved time period, f2(x) is the risk rate obtained by calculation and caused by the first-state duration proportion corresponding to the calculation-involved time period.

It should be understood that the above formulae of the first normalization processing and the second normalization processing may also be formulae of other normalization processing methods, may be specifically set according to actual application scenarios, and are not specifically limited in the embodiments of the present disclosure.

In some embodiments, the risk information includes a risk level and a risk rate. The operation S230 may specifically include the following operations S41 and S42.

At operation S41, the risk level of the link is added to topology map information of a network to which the link belongs to obtain updated topology map information, and the path computation on a preset service is triggered according to the updated topology map information.

At operation S42, during the path computation: for the link with a high risk level, the link with the high risk level is set as a disconnected link; for the link with a low risk level, the path computation is still performed; and for the link with a medium risk level, the path computation is performed based on a risk rate of the link with the medium risk level.

Through the above operations, when the preset service is rerouted, the risk information of each link can be added to map resources needed by the path computation. In this way, the risk suppression in the operation S240 can make use of different risk levels to avoid the risk links as much as possible, so as to achieve the purpose of suppressing the risk links. Thus, the path computation can be performed based on the risk information of the links: setting the high risk link as the disconnected link, taking the low risk link as the link which does not affect rerouting computation, and adding a corresponding risk rate strategy to the path computation of the medium risk link, so that the risk information and the risk rates of the links can be considered during the path computation, and risk avoidance and risk suppression can be carried out according to corresponding results of the path computation.

In some embodiments, the risk suppression comprises rerouting suppression. The operation of performing the path computation based on the risk rate of the link with the medium risk level in the operation S42 may specifically include the following operations S42-01 to S42-03.

At operation S42-01, the path computation is performed on the preset service using a preset path computation strategy to obtain a candidate rerouting path of the preset service; and the preset path computation strategy includes: an original rerouting computation strategy and a newly added risk rate strategy which is a computation strategy configured according to the risk rate of the link with the medium risk level.

At operation S42-02, the sum of risk rates of all links in each candidate rerouting path is calculated to obtain an accumulated risk rate of each candidate rerouting path.

At operation S42-03, the candidate rerouting path corresponding to a minimum rate value of the accumulated risk rates is selected as an optimal switch path of the path computation.

Through the above operations, in the process of performing the path computation using the path computation strategy, a plurality of path computation strategies may be adopted, the plurality of path computation strategies include the original rerouting computation strategy and the newly added risk rate strategy; and among the results of the path computation combined with the newly added risk rate strategy, the path with the minimum accumulated risk rate is selected as the optimal switch path of the rerouting, thereby achieving risk avoidance on the path switching of the rerouting of the service.

In some embodiments, performing the path computation on the preset service using the preset path computation strategy includes: performing the path computation on the preset service according to priority levels of the strategies included in the preset path computation strategy; and among the strategies included in the preset path computation strategy, a priority level of the risk rate strategy is lower than that of a highest priority strategy that is used for preferentially completing the rerouting of the preset service.

In the present embodiment, the original rerouting computation strategy may include, for example, a strategy needed by the rerouting, such as a minimal-hop strategy, and the risk rate strategy is the strategy of lowest priority level, that is, a link with the lowest accumulated risk rate is selected as far as possible on the basis that other strategies are satisfied; considering that the rerouting needs to be completed preferentially, the risk rate strategy may also adopt, for example, a second-lowest priority strategy, that is, the link with the lowest accumulated risk rate is preferentially selected on the basis that the rerouting strategy is completed preferentially.

In some embodiments, the risk suppression includes switch-back suppression. The operation of performing the path computation based on the risk rate of the link with the medium risk level in the operation S42 may specifically include the following operations S42-04 and S42-05.

At operation S42-04, the sum of risk rates of all links in the current service path of the preset service is calculated and taken as a current-path risk rate, and the sum of risk rates of all links in an original service path of the preset service is calculated and taken as an original-path risk rate.

At operation S42-05, in a case where the original-path risk rate is less than the current-path risk rate, the original-path risk rate is taken as a result of the path computation of the switch-back of the service.

Through the above operations, when the path of the service needs to be switched back, the accumulated risk rate of all the links in the current route and the accumulated risk rate of the switch-back route are calculated, and the path is switched back when the accumulated risk rate of the switch-back route is smaller; and the path is not switched back otherwise. Thus, risk avoidance on the path switching of the rerouting of the service is realized.

In some embodiments, the link in the embodiments of the present disclosure is a link composed of underlying network devices connected to a network controller via a southbound interface; the network controller is a network controller to which the link processing apparatus of the embodiment of the present disclosure belongs; and the state of the link is a link state information derived in advance from the received link change messages of the link, and the link change messages are messages reported by the underlying network devices via the southbound interface.

The link processing method according to an embodiment of the present disclosure further includes: sending the result of the path computation to the underlying network devices via the southbound interface of the network controller, so as to cause the underlying network devices to perform the path switching according to the result of the path computation.

In this embodiment, the network controller issues the result of the path computation to the device via the southbound interface for completion of the path switching.

In some embodiments, for the link with the high risk level, the link processing method further includes: in a case where the path computation is performed again, setting a penalty weight for the link with the high risk level, so as to reduce, according to the penalty weight, the number of services deployed on the link with the high risk level.

In this embodiment, for the link with the high risk level, the penalty weight for the link may be added during the subsequent path computation, so that the number of the services on the link can be reduced, and finally, frequent switching of the services can be adaptively suppressed from a management and control level, and invalid path switching caused by oscillating links can be effectively suppressed.

In some embodiments, the risk information includes a risk rate; and the link control method further includes: determining a link having a risk rate greater than a preset risk rate threshold in a network as a link prone to oscillation; and generating corresponding risk prompt information for the determined link prone to oscillation.

In the embodiments of the present disclosure, in view of the problem existing in the link oscillation, the link processing method according to the embodiment of the present disclosure can effectively identify the risk links having different influences, and can effectively suppress invalid rerouting and invalid switch-back caused by an oscillating link by adopting cross-level countermeasures; and the link processing method provided by the embodiments of the present disclosure can further provide the risk prompt for the link which may possibly oscillate in the future, and add the penalty weight to the link during the subsequent path computation, thereby reducing the number of the services on the link, and finally adaptively suppressing the frequent switching of the services from the management and control level.

Figure 3:
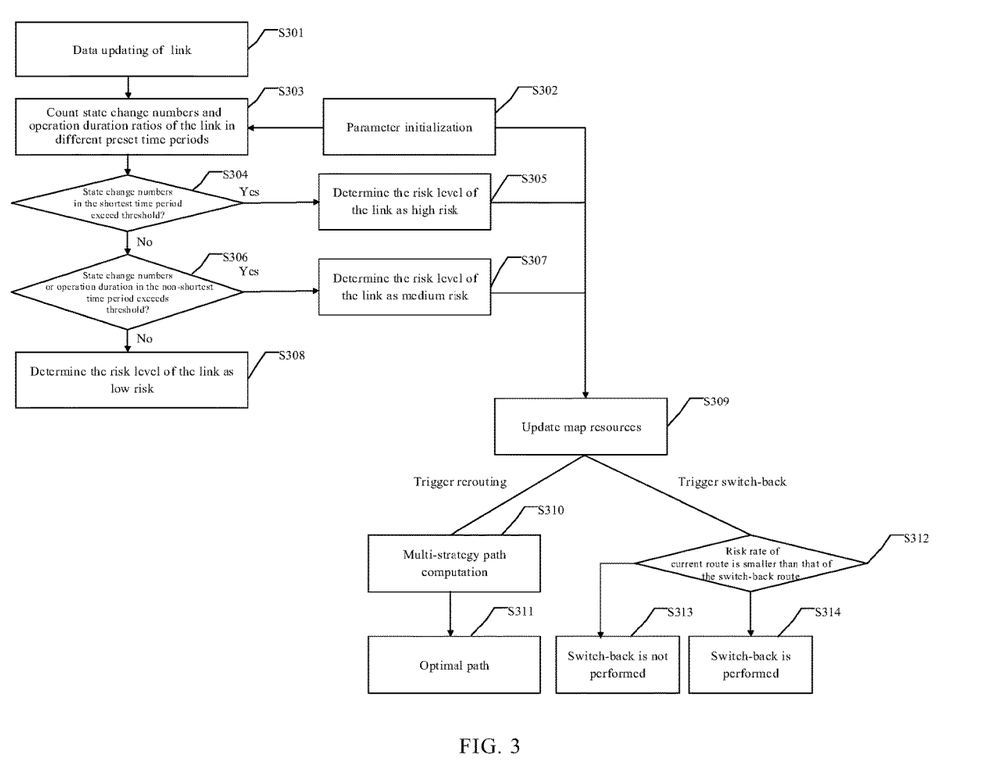
FIG. 3 is a detailed flowchart illustrating a link processing method according to an exemplary embodiment of the present disclosure.

FIG. 3 is a detailed flowchart illustrating a link processing method according to an exemplary embodiment of the present disclosure. As shown in FIG. 3, the link processing method may include the following operations S301 to S314.

At operation S301, data updating of a link is performed.

In this operation, data updating of links is classified into two modes: one is data updating of link state changes of all links triggered by a timer, and the other is data updating of a link state change of any link performed in response to link state change information which is reported by the any link and received via the southbound interface of the controller. The subsequent processes corresponding to the two data updating modes are the same.

At operation S302, parameter initialization is performed.

In this operation, a state change number threshold and an operation duration proportion threshold of the link may be set for each preset time period.

At operation S303, the numbers of state changes and the operation duration proportions of the link in different preset time periods are counted.

Illustratively, the different preset time periods include the shortest time period, the middle time period, and the longest time period that are described in the above embodiments.

At operation S304, it is determined whether the number of state changes of the link in the shortest time period exceeds the state change number threshold of the link; if the number of state changes in the shortest time period exceeds the state change number threshold, operation S305 is performed to determine the risk level of the link as high risk; and if the number of state changes in the shortest time period does not exceed the state change number threshold, operation S306 is performed.

At operation S306, it is determined whether the number of state changes in a non-shortest time period exceeds the state change number threshold corresponding to the non-shortest time period, or whether the operation duration proportion in the non-shortest time period exceeds the operation duration proportion threshold corresponding to the non-shortest time period. If the number of state changes in the non-shortest time period exceeds the state change number threshold corresponding to the non-shortest time period, or the operation duration proportion in the non-shortest time period exceeds the operation duration proportion threshold corresponding to the non-shortest time period, operation S307 is performed to determine the risk level of the link as medium risk; and if the number of state changes in the non-shortest time period does not exceed the state change number threshold corresponding to the non-shortest time period, or the operation duration proportion in the non-shortest time period does not exceed the operation duration proportion threshold corresponding to the non-shortest time period, operation S308 is performed to determine the risk level of the link as low risk.

Through the operations S301 to S308, risk identification of the link is completed.

At operation S309, map resources are updated.

In this operation, the risk information is added to the map resources needed by the path computation. The link with the high risk level is set as the disconnected link, the path computation is still performed on the link the low risk level, and the risk rate strategy is added to the link with the medium risk level.

At operation S310, as shown by "multi-strategy path computation" in FIG. 3, in a rerouting stage with risk suppression, a plurality of path computation strategies are adopted to perform the path computation. The plurality of path computation strategies include the original rerouting computation strategy and the newly added risk rate strategy.

At operation S311, in the result of the path computation, the link with the lowest accumulated risk rate is selected as the optimal path to complete the rerouting.

At operation S312, as shown by "the risk rate of the current route is smaller than that of the switch-back route" in FIG. 3, in a switch-back stage with risk suppression, it is determined whether the accumulated risk rate of the current route obtained by the computation is smaller than the accumulated risk rate of the switch-back route obtained by the computation; if the accumulated risk rate of the current route obtained by the computation is not smaller than the accumulated risk rate of the switch-back route obtained by the computation, which indicates that the accumulated risk rate of the switch-back route is smaller, operation S313 is performed to determine that switch-back of the link is to be performed; and if the accumulated risk rate of the current route obtained by the computation is smaller than the accumulated risk rate of the switch-back route obtained by the computation, operation S314 is performed to determine that the switch-back of the link is not to be performed.

Through the operations S306 to S311, the risk suppression for the link in the rerouting and switch-back processes is realized.

In the link processing method according to the embodiment of the present disclosure, the process of identifying the risk links is based on the real historical data of the links, each link in the network is independently analyzed, the algorithms are clear and do not belong to black box algorithms, an identification rate of the risk links can be more than 90%, and a high risk-identification rate can be achieved.

Furthermore, according to the embodiment of the present disclosure, prediction of a future oscillation situation of the links is achieved based on the counting of the historical data of the links. Since the time taken by the algorithms of risk identification is very short, the time consumption of the algorithms can be neglected in management and control of products, which allows for rapid risk identification.

In the embodiments of the present disclosure, the algorithms of risk identification and the rerouting/switch-back path computation can be combined, the risk rate strategy can be embedded in the path computation algorithms, and the invalid rerouting and switch-back caused by the oscillation can be effectively and adaptively suppressed. For a link which oscillates with high frequency, the link can be suppressed a hundred percent; and for a link which oscillates with low frequency, the link can be efficiently suppressed on the premise of ensuring that the network is actually unobstructed, thereby realizing a high suppression rate of the risk links.

Figure 4:
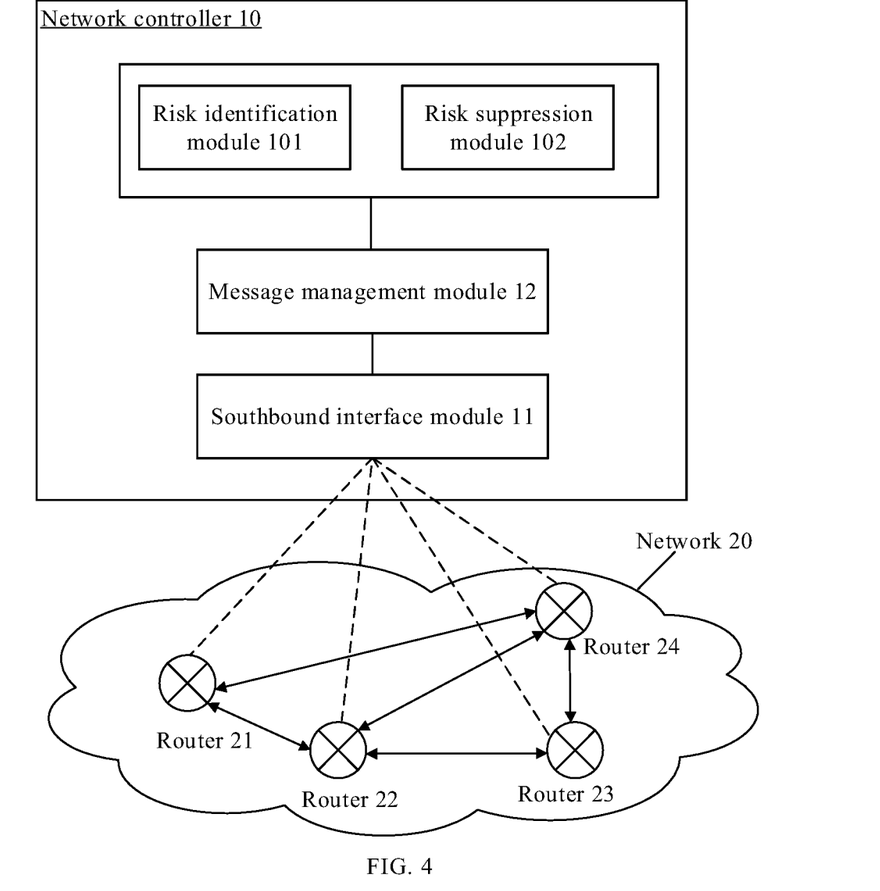
FIG. 4 is a schematic diagram of a system architecture according to another embodiment of the present disclosure.

FIG. 4 is a schematic diagram of a system architecture according to another embodiment of the present disclosure. The structures in FIG. 4 which are the same as or equivalent to the structures in FIG. 1 are given the same reference numerals. As shown in FIG. 4, the system architecture shown in FIG. 4 is different from that shown in FIG. 1 in that the network controller 10 in the system architecture in FIG. 4 may include: a risk identification module 101 and a risk suppression module 102.

The risk identification module 101 may be configured to calculate a risk rate of a link; and the risk suppression module 102 may be configured to perform path computation based on risk information of the link, so as to perform risk suppression on path switching according to a result of the path computation.

The risk identification module 101 is capable of timely responding to state change information of the link uploaded by each network device in the network 20, and is capable of determining and outputting the risk information of the link in real time.

The risk information in the embodiments of the present disclosure may include: a risk level and a risk rate. The risk level (i.e., a risk degree) may include, for example, three levels, i.e., low risk, medium risk, and high risk, and each risk level has a corresponding risk rate with a value range of 0 to 1. Specifically, for the high risk, the corresponding risk rate obtained by calculation may be, for example, greater than or equal to 0.8; for the medium risk, the corresponding risk rate obtained by calculation may be, for example, greater than or equal to 0.6 and less than 0.8; and for the low risk, the corresponding risk rate obtained by calculation may be, for example, less than 0.6.

In the risk suppression module 102, for a link identified as a high-risk link, the link is suppressed regardless of a state of the link, that is, computation for rerouting or switch-back is not performed until the link is not a high risk link any more. For a medium-risk link, computation for rerouting or switch-back is still performed, but is performed with an influence of the risk rate taken into consideration. For a low-risk link, computation for rerouting or switch-back is not affected.

In this system architecture, the network controller 10 may trigger risk link identification according to a received link oscillation message (e.g., a link change message reported by a network device via the southbound interface module 11), and the risk identification module 101 starts to calculate a risk level and a risk rate of a currently triggered link; the risk suppression module 102 starts to perform rerouting or switch-back, and the risk rate is preferentially considered in the path computation during the rerouting or switch-back; and after the risk suppression module 102 completes the path computation, the risk suppression module 102 feeds the result back to the network controller 10. The network controller 10 issues the result of the path computation to the network device via the southbound interface module 11 for completion of the path switching.

Figure 5:
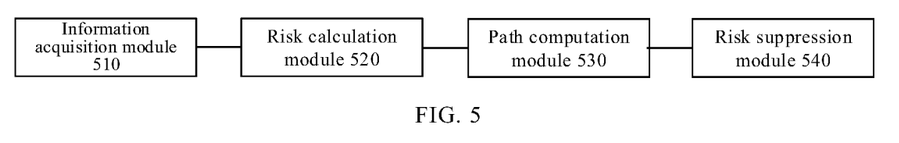
FIG. 5 is a schematic structural diagram of a link processing apparatus according to an embodiment of the present disclosure.

A link processing apparatus according to the embodiments of the present disclosure is described in detail below with reference to the drawings. FIG. 5 is a schematic structural diagram of a link processing apparatus according to an embodiment of the present disclosure. As shown in FIG. 5, the link processing apparatus may include the following modules.

An information acquisition module 510 is configured to acquire the number of state changes and first state duration of a link in a preset time period.

A risk calculation module 520 is configured to calculate risk information of the link based on the number of state changes and the first state duration.

A path computation module 530 is configured to perform path computation based on the risk information.

A risk suppression module 540 is configured to perform risk suppression on path switching according to a result of the path computation.

In some embodiments, the risk information includes a risk level; and the number of the preset time period is at least one. The risk calculation module 520 includes: a high-risk determination unit configured to determine a risk level of the link as high risk if it is determined that the number of state changes in a shortest time period is greater than or equal to a change number threshold corresponding to the shortest time period; and the shortest time period is a minimum value among the at least one preset time period, and is less than or equal to a preset time period threshold. The risk calculation module 520 further includes a medium-risk determination unit configured to determine, among the at least one preset time period, a risk level of the link in an acquired non-shortest time period as medium risk if it is determined that the number of state changes in the acquired non-shortest time period meets a corresponding change number limit condition or it is determined that the first state duration in the acquired non-shortest time period meets a corresponding duration limit condition. The risk calculation module 520 further includes a low-risk determination unit configured to determine the risk level of the link in the acquired non-shortest time period as low risk if it is determined that the number of state changes in the acquired non-shortest time period does not meet the corresponding change number limit condition and the first state duration in the acquired non-shortest time period does not meet the corresponding duration limit condition.

In some embodiments, the change number limit condition is: the number of state changes in the acquired non-shortest time period is greater than or equal to a preset change number threshold corresponding to the acquired non-shortest time period. In a case where a first state is a link-up state and a second state is a link-down state, the first state duration is operation duration, and the duration limit condition is: an operation duration proportion of the link in the non-shortest time period is less than an operation duration proportion threshold corresponding to the acquired non-shortest time period.

In some embodiments, in a case where the first state is the link-down state and the second state is the link-up state, the first state duration is idle duration, and the duration limit condition is: an idle duration proportion of the link in the acquired non-shortest time period is greater than or equal to an idle duration proportion threshold corresponding to the acquired non-shortest time period.

In some embodiments, the risk information includes a risk level and a risk rate. The risk calculation module 520 includes: a time-period determination unit configured to take a time period used when a risk level is obtained by calculation as a calculation-involved time period; a duration proportion calculation unit configured to obtain a first-state duration proportion in each calculation-involved time period according to a ratio of the first state duration in each calculation-involved time period to the corresponding calculation-involved time period; a risk rate calculation unit configured to perform normalization processing based on the number of state changes in each calculation-involved time period and a corresponding state change number threshold, and the first-state duration proportion in each calculation-involved time period and a corresponding first-state duration proportion threshold, so as to obtain risk rates of the link in each calculation-involved time period; and a maximum-risk-rate determination unit configured to take a maximum rate value of the risk rates of the link in each calculation-involved time period as a risk rate of the link.

In some embodiments, when performing the normalization processing, the risk rate calculation unit is further configured to: perform first normalization processing on the number of state changes in the calculation-involved time period and the corresponding state change number threshold to obtain the risk rate of the link caused by a state change in the calculation-involved time period, perform second normalization processing based on the first-state duration proportion in the calculation-involved time period and the corresponding first-state duration proportion threshold to obtain the risk rate of the link caused by the first-state duration proportion in the calculation-involved time period, and acquire the maximum rate value of the risk rates from the risk rate caused by the state change and the risk rate caused by the first-state duration proportion and take the maximum rate value of the risk rates as the risk rate corresponding to the risk level of the link.

In some embodiments, the link processing apparatus further includes: a link processing triggering module configured to determine that a current time reaches a time for regularly updating the risk information of the link or determine that state change information of the link is received before the risk information of the link is calculated based on the number of state changes and the first state duration.

In some embodiments, the risk information includes a risk level and a risk rate. The path computation module 530 may include: a map information updating unit configured to add a risk level of the link to topology map information of a network to which the link belongs to obtain updated topology map information; and a triggering unit configured to trigger the path computation on a preset service according to the updated topology map information. During the path computation, the path computation module 530 is further configured to: for the link with a high risk level, set the link with the high risk level as a disconnected link; for the link with a low risk level, still perform the path computation; and for the link with a medium risk level, perform the path computation based on a risk rate of the link with the medium risk level.

In some embodiments, the risk suppression includes rerouting suppression. When configured to perform the path computation based on the risk rate of the link with the medium risk level, the path computation module 530 may include the following units: a strategy path computation unit configured to perform the path computation on the preset service using a preset path computation strategy to obtain a candidate rerouting path of the preset service, with the preset path computation strategy including: an original rerouting computation strategy and a newly added risk rate strategy which is a computation strategy configured according to the risk rate of the link with the medium risk level; a sum-of-risk-rates calculation unit configured to calculate the sum of risk rates of all links in each candidate rerouting path to obtain an accumulated risk rate of each candidate rerouting path; and a switch path determination unit configured to select the candidate rerouting path corresponding to a minimum rate value of the accumulated risk rates as an optimal switch path of the path computation.

In some embodiments, when performing the path computation on the preset service using the preset path computation strategy, the strategy path computation unit may be specifically configured to: perform the path computation on the preset service according to priority levels of the strategies included in the preset path computation strategy; and among the strategies included in the preset path computation strategy, a priority level of the risk rate strategy is lower than that of a highest priority strategy that is used for preferentially completing the rerouting of the preset service.

In some embodiments, the risk suppression includes switch-back suppression. When configured to perform the path computation based on the risk rate of the link with the medium risk level, the path computation module 530 may include the following units: a current-path risk rate calculation unit configured to calculate the sum of risk rates of all links in a current service path of the preset service and take the sum as a current-path risk rate; an original-path risk rate calculation unit configured to calculate the sum of risk rates of all links in an original service path of the preset service and take the sum as an original-path risk rate; and a switch-back path computation unit configured to take, in a case where the original-path risk rate is less than the current-path risk rate, the original-path risk rate as a result of the path computation of the switch-back of the service.

In some embodiments, the link is a link composed of underlying network devices connected to a network controller via a southbound interface, and the network controller is the network controller of the link processing apparatus; and the state of the link is link state information derived in advance from received link change messages of the link, and the link change messages are messages reported by the underlying network devices via the southbound interface.

In the embodiments of the present disclosure, the link processing apparatus further includes: a computation result issue module configured to send the result of the path computation to the underlying network devices via the southbound interface, so as to cause the underlying network devices to perform path switching according to the result of the path computation.

In some embodiments, for the link with the high risk level, the link processing apparatus further includes: a weight setting module configured to set a penalty weight for the link with the high risk level in a case where the path computation is performed again, so as to reduce, according to the penalty weight, a number of services deployed on the link with the high risk level.

In some embodiments, the risk information includes a risk rate. The link processing apparatus further includes: an oscillation link determination module configured to determine a link having a risk rate greater than a preset risk rate threshold as a link prone to oscillation; and a risk prompt module configured to generate corresponding risk prompt information for the determined link prone to oscillation.

In view of the problem existing in the link oscillation, the link processing apparatus according to the embodiments of the present disclosure can effectively identify the risk links having different influences, and can effectively suppress invalid rerouting and invalid switch-back caused by an oscillating link by adopting cross-level countermeasures; and the link processing apparatus according to the embodiments of the present disclosure can further provide the risk prompt for the link which may possibly oscillate in the future, and add the penalty weight to the link during the subsequent path computation, thereby reducing the number of the services on the link, and finally adaptively suppressing the frequent switching of the services from the management and control level.

It should be noted that the present disclosure is not limited to the specific configurations and processing described in the above embodiments and illustrated by the drawings. For convenience and simplicity of description, a detailed description of known methods is omitted herein, reference may be made to corresponding processes in the above method embodiments for specific operation processes of the systems, modules and units described above, and those specific operation processes will not be described in detail herein.

Figure 6:
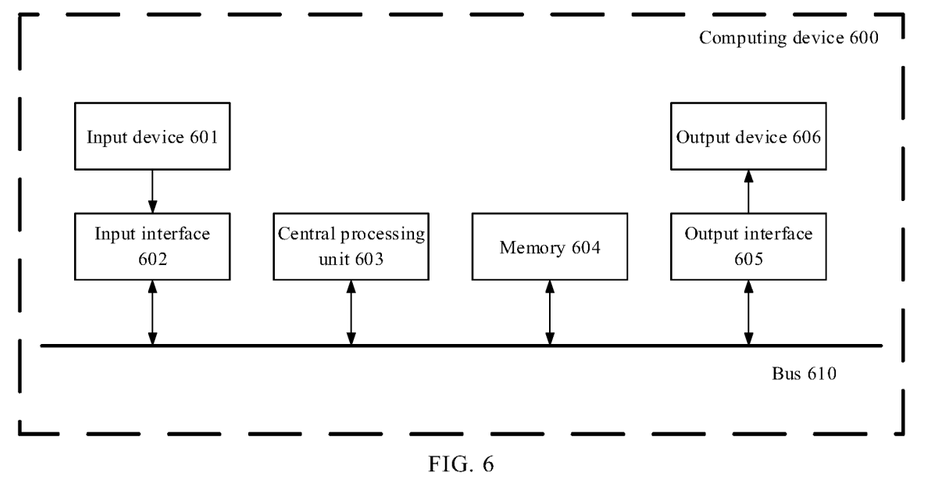
FIG. 6 is a schematic structural diagram illustrating an exemplary hardware architecture of a computing device capable of implementing the link processing method and apparatus according to the embodiments of the present disclosure.

FIG. 6 is a schematic structural diagram illustrating an exemplary hardware architecture of a computing device capable of implementing a link processing method and apparatus according to the embodiments of the present disclosure.

As shown in FIG. 6, a computing device 600 includes an input device 601, an input interface 602, a central processing unit 603, a memory 604, an output interface 605, and an output device 606. The input interface 602, the central processing unit 603, the memory 604, and the output interface 605 are connected to each other through a bus 610, and the input device 601 and the output device 606 are connected to the bus 610 through the input interface 602 and the output interface 605 respectively, so as to be further connected to other components of the computing device 600.

Specifically, the input device 601 receives input information from the outside, and transmits the input information to the central processing unit 603 via the input interface 602; the central processing unit 603 processes the input information based on computer-executable instructions stored in the memory 604 to generate output information, temporarily or permanently stores the output information in the memory 604, and then transmits the output information to the output device 606 via the output interface 605; and the output device 606 outputs the output information out of the computing device 600 for being used by users.

In an embodiment, the computing device shown in FIG. 6 may be implemented as a network device which may include: a memory configured to store a program; and a processor configured to run the program stored in the memory to perform the link processing method described in the above embodiments.

The above description is merely of the exemplary embodiments of the present disclosure, and is not intended to limit the scope of the present disclosure. In general, the various embodiments of the present disclosure may be implemented by hardware or special circuits, software, logic or any combination thereof. For example, some aspects of the present disclosure may be implemented by hardware and other aspects may be implemented by firmware or software executable by a controller, a microprocessor or other computing devices, but the present disclosure is not limited thereto.

The embodiments of the present disclosure may be implemented by a data processor of a mobile device executing computer program instructions. For example, the embodiments of the present disclosure are implemented in a processor entity, or by hardware, or by a combination of software and hardware. The computer program instructions may be assembly instructions, Instruction Set Architecture (ISA) instructions, machine instructions, machine-related instructions, microcode, firmware instructions, state setting data, or source code or object code written in one programming language or in any combination of a plurality of programming languages.

A block diagram illustrating any logic flow in the drawings of the present disclosure may show operations of a program, or interconnected logic circuits, modules and functions, or a combination of the operations of the program and the logic circuits, modules and functions. The computer program can be stored on a memory. The memory may be of any type suitable to local technical environment and may be implemented using any suitable data storage technology. For example, the memory is, but not limited to, a Read-Only Memory (ROM), a Random Access Memory (RAM), and an optical storage device and system (a Digital Video Disc (DVD) or a Compact Disc (CD)). A computer-readable medium may include a non-transitory storage medium. The data processor may be of any type suitable to the local technical environment. For example, the data processor is, but not limited to, a general-purpose computer, a special purpose computer, a microprocessor, a Digital Signal Processors (DSP), an Application Specific Integrated Circuit (ASIC), a Field Programmable Gate Array (FGPA), and a processor based on multi-core architecture.

The exemplary embodiments of the present disclosure are illustrated in detail above by exemplary and non-limiting examples. For those of ordinary skill in the art, various modifications and adjustments to the above embodiments can be obviously derived from the accompanying drawings and the appended claims, but those modifications and adjustments are not beyond the scope of the present disclosure. Therefore, the proper scope of the present disclosure is defined by the appended claims.

What is claimed is:

1. A link processing method, comprising:
   acquiring a number of state changes and first state duration of a link in a preset time period;
   calculating risk information of the link based on the number of state changes and the first state duration in the preset time period;
   performing path computation based on the risk information; and
   performing risk suppression on path switching according to a result of the path computation,
   wherein the risk information comprises a risk level and a risk rate; and wherein calculating the risk information of the link based on the number of state changes and the first state duration comprises:
   taking a time period used when the risk level is obtained by calculation as a calculation-involved time period;
   obtaining a first-state duration proportion in each calculation-involved time period according to a ratio of the first state duration to the corresponding calculation-involved time period;
   performing normalization processing based on the number of state changes in each calculation-involved time period and a corresponding state change number threshold as well as the first-state duration proportion in each calculation-involved time period and a corresponding first-state duration proportion threshold, so as to obtain risk rates of the link in each calculation-involved time period; and
   taking a maximum rate value of the risk rates of the link in the respective calculation-involved time periods as a risk rate of the link, and
   wherein the normalization processing comprises:
   performing first normalization processing on the number of state changes in the calculation-involved time period and the corresponding state change number threshold to obtain a risk rate of the link caused by the state changes in the calculation-involved time period;
   performing second normalization processing based on the first-state duration proportion in the calculation-involved time period and the corresponding first-state duration proportion threshold to obtain a risk rate of the link caused by the first-state duration proportion in the calculation-involved time period; and
   acquiring a maximum rate value of the risk rates from the risk rate caused by the state change and the risk rate caused by the first-state duration proportion, and taking the maximum rate value of the risk rates as the risk rate corresponding to a risk level of the link.

2. The method of claim 1, wherein the risk information comprises a risk level; wherein a number of the preset time period is at least one; and wherein calculating the risk information of the link based on the number of state changes and the first state duration comprises:
   in a case where the number of state changes in a shortest time period is greater than or equal to a change number threshold corresponding to the shortest time period, determining a risk level of the link as high risk; wherein the shortest time period is the shortest one of the at least one preset time period, and is less than or equal to a preset time period threshold;
   in a case where the number of state changes in an acquired non-shortest time period among the at least one preset time period meets a corresponding change number limit condition, or in a case where the first state duration in the acquired non-shortest time period meets a corresponding duration limit condition, determining a risk level of the link in the acquired non-shortest time period as medium risk; and
   in a case where the number of state changes in the acquired non-shortest time period does not meet the corresponding change number limit condition and the first state duration in the acquired non-shortest time period does not meet the corresponding duration limit condition, determining the risk level of the link in the acquired non-shortest time period as low risk.

3. The method of claim 2, wherein
   the change number limit condition is: the number of state changes in the acquired non-shortest time period is greater than or equal to a preset change number threshold corresponding to the acquired non-shortest time period;
   the number of state changes is a number of changes from a first state to a second state; and wherein
   the first state is a link-up state, the second state is a link-down state, the first state duration is operation duration, and the duration limit condition is: an operation duration proportion of the link in the non-shortest time period is less than an operation duration proportion threshold corresponding to the acquired non-shortest time period; or
   the first state is the link-down state, the second state is the link-up state, the first state duration is idle duration, and the duration limit condition is: an idle duration proportion of the link in the acquired non-shortest time period is greater than or equal to an idle duration proportion threshold corresponding to the acquired non-shortest time period.

4. The method of claim 1, wherein before calculating the risk information of the link based on the number of state changes and the first state duration, the method further comprises:
determining that a current time reaches a time for regularly updating the risk information of the link; or
determining that state change information of the link is received.

5. The method of claim 1, wherein the risk information comprises a risk level and a risk rate; and wherein performing the path computation based on the risk information comprises:
adding the risk level of the link to topology map information of a network to which the link belongs, so as to obtain updated topology map information; and
triggering the path computation on a preset service according to the updated topology map information;
wherein during the path computation:
for the link with a high risk level, setting the link with the high risk level as a disconnected link;
for the link with a low risk level, continuing to perform the path computation; and
for the link with a medium risk level, performing the path computation based on the risk rate of the link with the medium risk level.

6. The method of claim 5, wherein the risk suppression comprises rerouting suppression; and wherein performing the path computation based on the risk rate of the link with the medium risk level comprises:
performing the path computation on the preset service using a preset path computation strategy to obtain a candidate rerouting path of the preset service; wherein the preset path computation strategy comprises: an original rerouting computation strategy and a newly added risk rate strategy, the newly added risk rate strategy being a computation strategy configured according to the risk rate of the link with the medium risk level;
calculating a sum of risk rates of all links in each candidate rerouting path to obtain an accumulated risk rate of each candidate rerouting path; and
selecting a candidate rerouting path corresponding to a minimum rate value of accumulated risk rates as an optimal switch path of the path computation.

7. The method of claim 6, wherein performing the path computation on the preset service using the preset path computation strategy comprises:
performing the path computation on the preset service according to priority levels of strategies included in the preset path computation strategy;
wherein, among the strategies included in the preset path computation strategy, a priority level of the risk rate strategy is lower than a priority level of a highest priority strategy that is used for preferentially completing rerouting of the preset service.

8. The method of claim 5, wherein the risk suppression comprises switch-back suppression; and wherein performing the path computation based on the risk rate of the link with the medium risk level comprises:
calculating a sum of risk rates of all links in a current service path of the preset service as a current-path risk rate, and calculating a sum of risk rates of all links in an original service path of the preset service as an original-path risk rate; and
in a case where the original-path risk rate is less than the current-path risk rate, taking the original-path risk rate as a result of the path computation of switch-back of the service.

9. The method of claim 1, wherein
the link is a link composed of underlying network devices connected to a network controller via a southbound interface, and the network controller is a network controller to which the link processing apparatus belongs;
a state of the link is link state information derived in advance from received link change messages of the link, and the link change messages are messages reported by the underlying network devices via the southbound interface; and
the method further comprises: sending the result of the path computation to the underlying network devices via the southbound interface, so as to cause the underlying network devices to perform the path switching according to the result of the path computation.

10. The method of claim 1, wherein the risk information comprises a risk level, and for the link with a high risk level, the link processing method further comprises:
in a case where the path computation is performed again, setting a penalty weight for the link with the high risk level, so as to reduce, according to the penalty weight, a number of services deployed on the link with the high risk level.

11. The method of claim 1, wherein the risk information comprises a risk rate; and the method further comprises:
determining the link having a risk rate greater than a preset risk rate threshold as a link prone to oscillation; and
generating corresponding risk prompt information for the determined link prone to oscillation.

12. A network device, comprising:
one or more processors; and
a memory having stored thereon one or more programs which, when executed by the one or more processors, cause the one or more processors to implement the method of claim 1.

13. A non-transitory computer-readable storage medium storing a computer program which, when executed by a processor, implements the method of claim 1.

* * * * *